Figure 1:
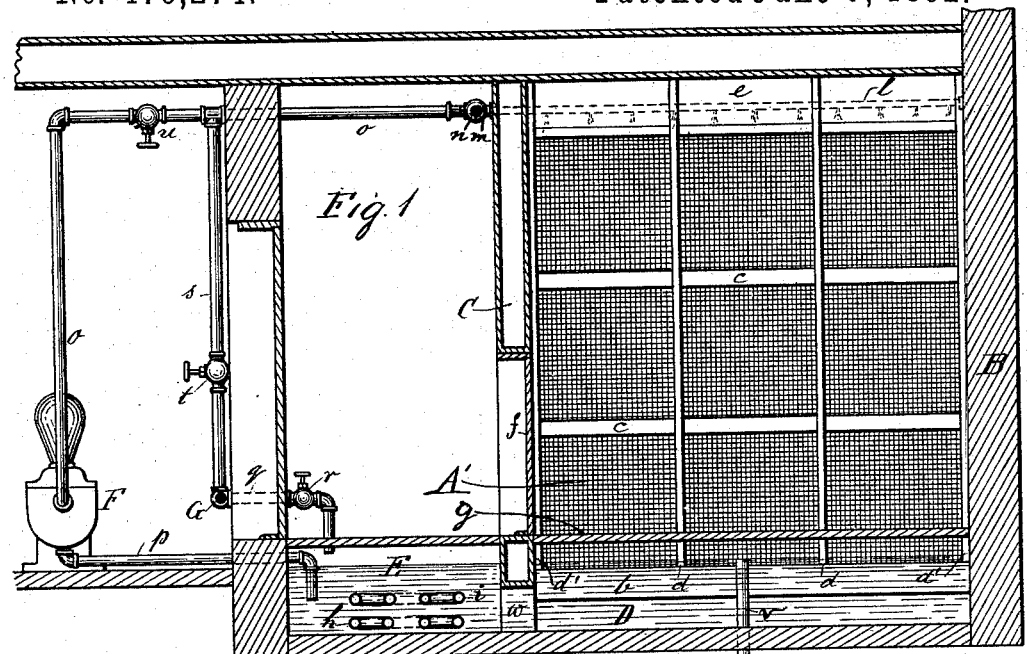

(No Model.) 2 Sheets—Sheet 1.

L. C. HUCK.
APPARATUS FOR PURIFYING, MOISTENING, AND ATTEMPERATING AIR.

No. 476,274. Patented June 7, 1892.

Witnesses
Otto Luebkert
John L. Pearson

Inventor
Louis C. Huck
By Wm. H. Lotz
his attorney

THE NORRIS PETERS CO., PHOTO-LITHO., WASHINGTON, D. C.

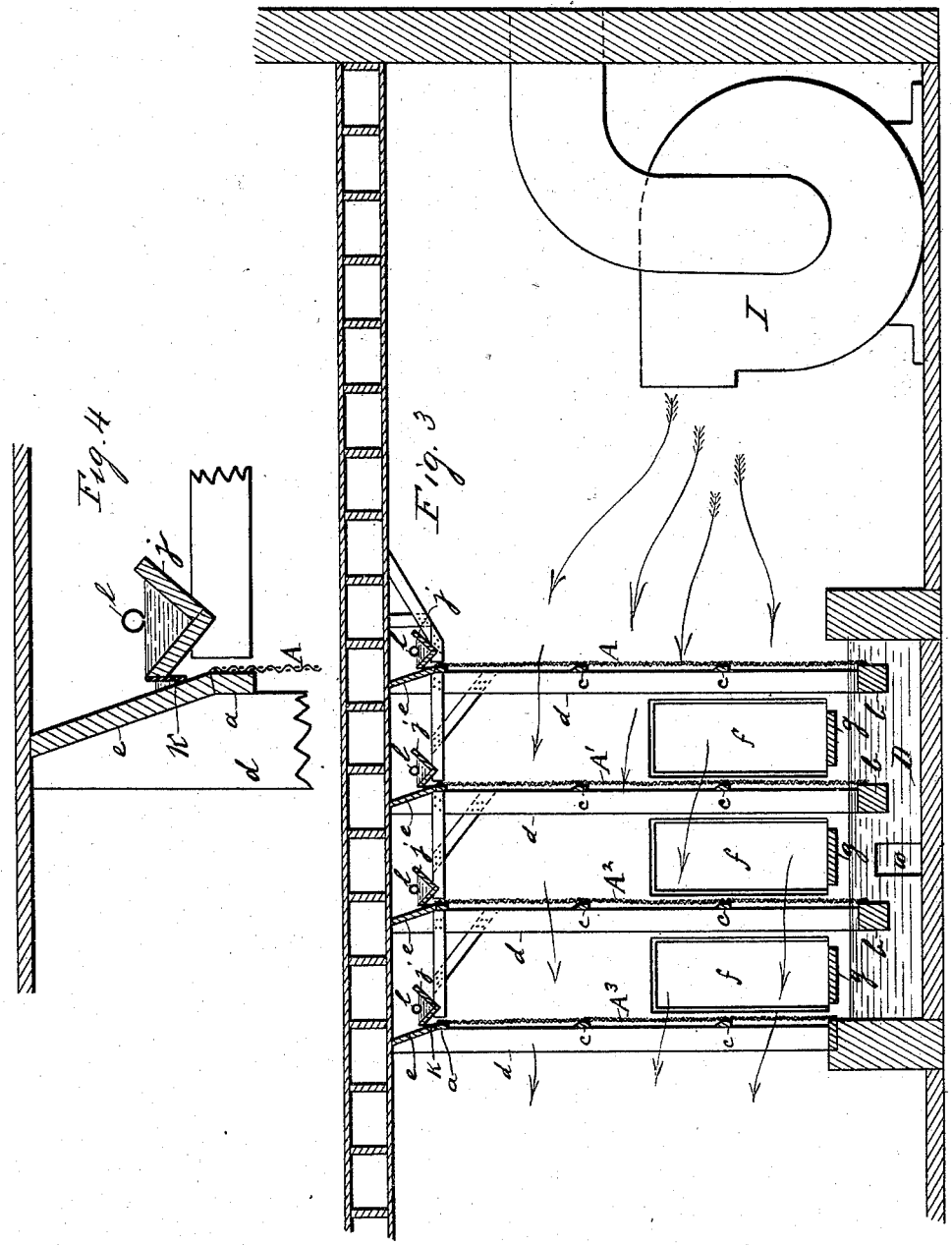

UNITED STATES PATENT OFFICE.

LOUIS C. HUCK, OF CHICAGO, ILLINOIS.

APPARATUS FOR PURIFYING, MOISTENING, AND ATTEMPERATING AIR.

SPECIFICATION forming part of Letters Patent No. 476,274, dated June 7, 1892.

Application filed December 22, 1890. Serial No. 375,448. (No model.)

*To all whom it may concern:*

Be it known that I, LOUIS C. HUCK, a citizen of the United States of America, residing at Chicago, in the county of Cook and State of Illinois, have invented certain new and useful Improvements in Apparatus for Purifying, Attemperating, and Moistening Air, of which the following is a specification, reference being had therein to the accompanying drawings.

My invention relates to devices and apparatuses for purifying, attemperating, and moistening air. Air thus prepared is well adapted for ventilating beer-vaults and fermenting-rooms, and is particularly required for the malting of grain by the pneumatic process, in which pure air is forced through a thick layer of grain by means of blowers or exhaust-fans, such grain having previously been steeped with water in steeping-tanks and spread upon the perforated floors of boxes or compartments. During the process of malting the air so forced through the grain will furnish it the required oxygen and will carry off the gases produced by germination, being principally carbonic-acid and nitrogen gases. It is essential that the air so forced through such grain be perfectly free from putrid matter and other impurities predisposing mold formation, that it be of that uniform temperature during all seasons of the year which is most favorable for a natural healthy growth of the grain, and that it be impregnated with moisture to its full capacity, so that while passing through the grain the moisture carried with the air will compensate for the moisture evaporated from the grain by ventilation. To attain the above requisite conditions of the air, cumbrous, complicated, and expensive apparatus and machinery have heretofore been employed.

It is the object of this invention to provide a more simple and effective device that will thoroughly and automatically wash the air, attemperate it to the desired degree by direct contact with water, (which, according to the season of the year or the outdoor temperature, may be artificially cooled or heated,) and at the same time will impregnate the air with as much moisture as it can absorb.

This apparatus is not only very simple in its construction, not likely to get out of order, and easy to regulate, but is also readily accessible for thorough cleansing without stopping its operation. It enables the easy removal of any and all impurities carried by the outdoor atmosphere, which, when permitted to accumulate in the apparatus, are apt to deposit slimy precipitations, which clog the apparatus and favor mold formation.

With the above object in view my invention consists of the novel devices and combination of devices hereinafter described and specifically claimed.

Figure 2:
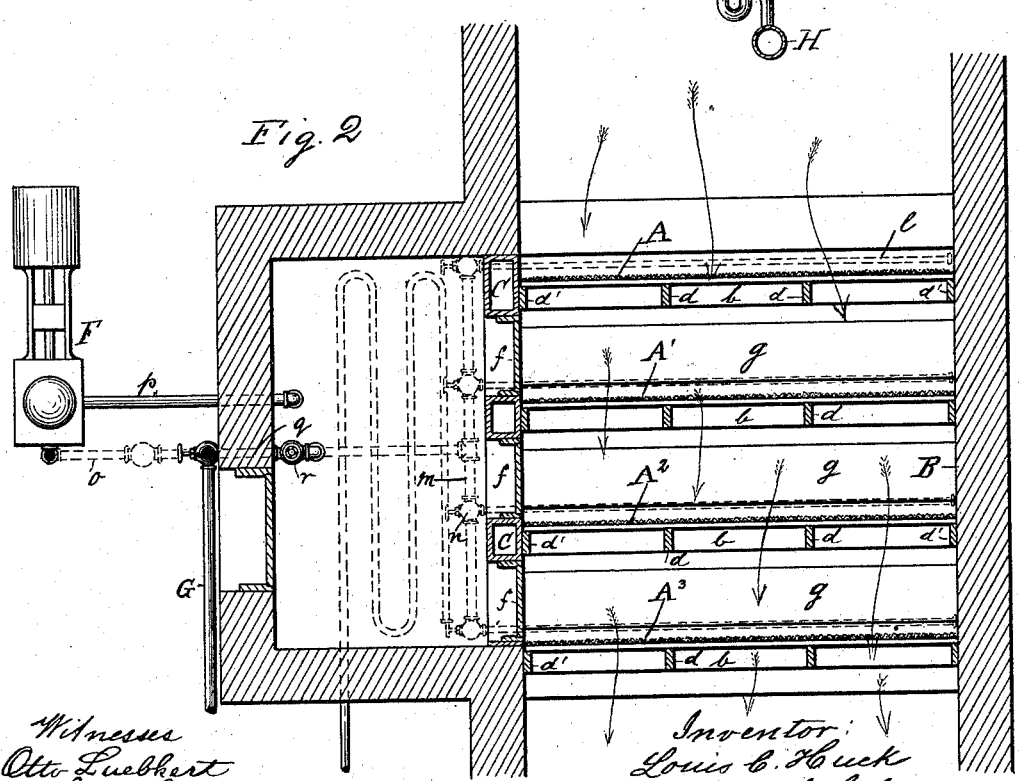

In the accompanying drawings, Figure 1 represents a longitudinal vertical section, Fig. 2 a sectional plan view, and Fig. 3 a transverse vertical section, of the apparatus; and Fig. 4 is a transverse section of one of the water-supply channels on an enlarged scale.

Corresponding letters of reference in the several figures of the drawings designate like parts.

A A' $A^2$ $A^3$ denote wire screens or nettings placed vertically at equal distances apart, leaving open spaces between them sufficiently large to permit a man to walk freely between the screens and clean them. These wire screens may be woven of copper, brass, galvanized or tinned iron or steel wire, or other suitable material which will not oxidize and should be fine nettings of about twelve meshes to the inch in either direction. These screens A A', &c., are stretched and secured against a top strip $a$, a bottom strip or beam $b$, and intermediate strips $c$, all horizontal and parallel with each other, and the strips $c$ are beveled on their upper edges so as to incline toward the netting for the purpose of guiding the water in its vertical course over the screen. The strips $a$ and $c$ are secured against uprights $d$, extending from the beams $b$ to the ceiling, where, above strips $a$, they are chamfered, and each row of uprights $d$ is connected and covered by an inclined board $e$. The end uprights $d'$ are placed against the walls B and C, the latter wall being provided with a series of openings closed by doors $f$, one for each space between the screens A A', &c., and from each door-opening a plank or bridge $g$ extends to the opposite wall B to stand or walk upon while cleaning the screens. It will thus be seen that each of the screens A A', &c., have practically air-tight connections in the walls B and C, since they are secured to the end uprights $d'$, and these uprights are secured to said walls B and C. The lower beams $b$ are supported in a basin D, so as to be partly or entirely submerged in water, and this basin D, through an opening $w$ in wall C, communicates with another basin E in an antechamber, and in the bottom of this basin E is placed a coil of pipes $h$ in which live or exhaust steam may be circulated to warm the water in the basin in winter time, and over this steam-coil $h$ may be placed another coil of pipes for circulating brine from an ice-machine that will cool the water in summer time in case the water from the supply-pipe is not sufficiently cold.

Above each screen A A′, &c., a trough $j$, in close proximity with angular board $e$, is supported on a gallows-frame or suspended in any other convenient manner, the top edge of which trough, adjacent to board $e$, is lower than its opposite edge. To this lower edge is secured a strip $k$ of sheet-rubber, the pendent edge of which strip leans against the inclined board $e$. Above each trough $j$ is placed a pipe $l$, perforated in its bottom for distributing the water discharged therefrom uniformly into such trough $j$. The trough is placed perfectly horizontal, and when overflowing its lower edge the water will enter the space between the rubber strips $k$ and the inclined board $e$ in a very thin continuous sheet and then trickle down over the entire surface of screen A into basin D. Thus it will be seen that each screen can be constantly covered with water. It will further be seen that by reason of the lower edges of the screens being submerged in said basins, the upper edges being secured to strips A, which are located against the lower edges of inclined parts $e$ and their side edges being secured to said walls B and C, said screens have practically air-tight connections with the sides of the chamber and within which they are located. The several pipes $l$ are branches of a pipe $m$, each communicating therewith through a stop and regulating-valve $n$, and the pipe $m$ communicates through a pipe $o$ with a pump F, and the suction-pipe $p$ of this pump communicates with the basin E, so that the same water can be continuously circulated through pipes $l$ and pass over the screens.

G is a fresh-water-supply pipe, from which a branch pipe $q$, provided with a valve $r$, will feed a necessary supply of fresh water into basin E. Another branch $s$ of pipe G connects with pipe $o$ for supplying fresh water directly to pipes $l$, and each pipe $s$ and $o$ is provided with a valve $t$ and $u$ for shutting off either communication.

An overflow-pipe $v$ leads into sewer H for carrying off the surface water and such impurities separated from the air as will float on the water in the basin.

A fan I or other air pumping or forcing machine will draw air from outdoors and will discharge it into the room in front of the screens. This fan or air-pump, however, may be placed anywhere in the building where it can discharge into the space in front of the screens. The air thus forced can find its escape only through the several screens A A′, &c., by reason of the practically air-tight connection between said screens and the sides of the chamber within which they are inclosed. It is obvious that such connections need not be perfectly air-tight, because the pressure necessary to force the air through the screens is not great, owing to the slight resistance offered to such air-current, so that all that is necessary is that such connections should be close enough, as shown in the drawings, that the air will be caused to pass through said screens.

The screens may be multiplied to any desired number, and as each screen is covered by the sheet of water trickling down over its entire surface the air must pass through water as many times as screens are provided, and will thus be cooled in summer not only by its contact with water of lower temperature, but also by the cooling effects of the evaporation of a portion of such water. During the winter time, however, the water will be heated to the required degree by the steam-coil $h$, and the air while passing through such water will be warmed to the desired degree of temperature. Through the opening $w$ the water collecting in basin D will flow into basin E, in which, according to the season, only sufficient fresh water may be admitted from supply-pipe G through valve $r$ to compensate for the evaporation and the necessary overflow through pipe $v$ into sewer H. During the summer time the pump may be stopped and an entire supply of fresh water from pipe G will be passed over the screens for cooling the air to the desired degree of temperature, and the amount of this supply can be regulated by valves $n$.

From time to time a man can enter first through one door $f$ and then through the other, and while standing on plank or bridge $g$ can clean the screens thoroughly without the necessity of stopping the air-blast or water circulation, which is of great importance, since the utmost cleanliness is essential in apparatus of this kind.

The special arrangement of this apparatus can be adapted to different locations at pleasure without deviating from the general construction. It is not essential in this apparatus that the wire screens A A′, &c., be placed vertically, since they may be placed somewhat inclined as well; nor is it essential that the boards $e$ should be on an incline, as they may be placed vertically; but if so arranged then the rubber strips $k$ must be on an incline, so that their pendent edges will be in contact with such board $e$.

What I claim is—

1. In an apparatus for the purpose described, the combination, with an air-blast and with a series of wire screens placed vertically or nearly vertically to an inclined board at the top of each screen, with a trough adjacent to each such board, providing an overflow toward such inclined board and down the screen below it, of a water-supply for such trough, substantially as set forth.

2. In an apparatus for the purpose described, the combination, with an air-blast and a series of wire screens placed vertically or nearly vertically, with an inclined board above each screen, and adjacent to such board a trough, with a water-feed pipe in or above each trough, of an elastic strip attached to the overflow edge of such trough and depending so that the pendent edge of such strip is in contact with such inclined board, all substantially as set forth.

3. An apparatus for the purpose described, comprised of the following elements, viz: a series of wire screens placed vertically above a water-basin and extending to the lower edge of the inclined boards above, a walking plank or bridge between each two wire screens, troughs adjacent to such inclined boards, each having attached to its overflow edge an elastic strip pendent against the inclined board, perforated pipes in or above such troughs, communicating through regulating-valves with the fresh-water-supply pipe and also with the discharge-pipe of a pump, the suction-pipe of which extends into the basin, and pipe-coils for steam or brine arranged within such basin, all substantially as set forth.

In testimony whereof I affix my signature in presence of two witnesses.

LOUIS C. HUCK.

Witnesses:
 OTTO LUEBKERT,
 JOHN L. PEARSON.